(12) United States Patent
Hildreth et al.

(10) Patent No.: US 6,816,848 B1
(45) Date of Patent: Nov. 9, 2004

(54) SQL-BASED ANALYTIC ALGORITHM FOR CLUSTER ANALYSIS

(75) Inventors: James Dean Hildreth, Fallbrook, CA (US); Scott Woodroofe Cunningham, San Diego, CA (US)

(73) Assignee: NCR Corporation, Dayton, OH (US)

( * ) Notice: Subject to any disclaimer, the term of this patent is extended or adjusted under 35 U.S.C. 154(b) by 830 days.

(21) Appl. No.: 09/592,024

(22) Filed: Jun. 12, 2000

(51) Int. Cl.[7] .................................................. G06N 5/00
(52) U.S. Cl. ........................................ 706/45; 706/46
(58) Field of Search .............................. 706/45, 46, 47; 707/5, 6, 3, 101, 102

(56) References Cited

U.S. PATENT DOCUMENTS

| | | | |
|---|---|---|---|
| 5,701,400 A | | 12/1997 | Amado |
| 5,734,887 A | | 3/1998 | Kingberg et al. |
| 5,787,425 A | | 7/1998 | Bigus |
| 5,799,310 A | | 8/1998 | Anderson et al. |
| 6,263,334 B1 | * | 7/2001 | Fayyad et al. ............... 707/5 |
| 6,263,337 B1 | * | 7/2001 | Fayyad et al. ............... 707/6 |
| 6,496,834 B1 | * | 12/2002 | Cereghini et al. .......... 707/102 |
| 6,519,591 B1 | * | 2/2003 | Cereghini et al. ............. 707/6 |
| 6,549,907 B1 | * | 4/2003 | Fayyad et al. ............. 707/101 |
| 6,581,058 B1 | * | 6/2003 | Fayyad et al. ................ 707/6 |
| 6,615,205 B1 | * | 9/2003 | Cereghini et al. ............. 707/3 |
| 6,633,882 B1 | * | 10/2003 | Fayyad et al. ............. 707/101 |

OTHER PUBLICATIONS

G. Graefe et al., "On the Efficient Gathering of Sufficient Statistics for Classification from Large SQL Databases," Microsoft Corporation, Abstract, © 1998, 5 pages.
P.S. Bradley et al., "Scaling EM (Expectation–Maximization) Clustering to Large Databases," Microsoft Corporation, Technical Report, Feb. 1999, 21 pages.

* cited by examiner

Primary Examiner—Wilbert L. Starks, Jr.
(74) Attorney, Agent, or Firm—Gates & Cooper LLP

(57) ABSTRACT

A method, apparatus, and article of manufacture for performing data mining applications in a relational database management system. An analytic algorithm for cluster analysis is performed by the computer. The analytic algorithm for cluster analysis includes SQL statements and programmatic iteration for finding one or more groupings in the data retrieved from the relational database management system and for identifying homogenous ones of the groupings as clusters. The analytic algorithm for cluster analysis creates at least one analytic model within an analytic logical data model from data residing in the relational database.

69 Claims, 3 Drawing Sheets

SQL-BASED ANALYTIC ALGORITHM FOR CLUSTER ANALYSIS

CROSS-REFERENCE TO RELATED APPLICATIONS

This application is also related to the following co-pending and commonly-assigned utility patent applications:

Application Ser. No. PCT/US99/22966, filed Oct. 1, 1999, by Timothy E. Miller, Brian D. Tate, James D. Hildreth, Todd M. Brye, Anthony L. Rollins, James E. Pricer, and Tej Anand, entitled SQL-Based Analytic Algorithms, Application Ser. No. 09/410,528, filed Oct. 1, 1999, by Brian D. Tate, James E. Pricer, Tej Anand, and Randy G. Kerber, entitled SQL-Based Analytic Algorithm for Association, Application Ser. No. 09/410,531, filed Oct. 1, 1999, by James D. Hildreth, entitled SQL-Based Analytic Algorithm for Clustering, Application Ser. No. 09/410,530, filed Oct. 1, 1999, by Todd M. Brye, entitled SQL-Based Analytic Algorithm for Rule Induction, Application Ser. No. 09/411,818, filed Oct. 1, 1999, by Brian D. Tate, entitled SQL-Based Automated Histogram Bin Data Derivation Assist, Application Ser. No. 09/410,534, filed Oct. 1, 1999, by Brian D. Tate, entitled SQL-Based Automated, Adaptive, Histogram Bin Data Description Assist, Application Ser. No. PCT/US99/22995, filed Oct. 1, 1999, by Timothy E. Miler, Brian D. Tate, Miriam H. Herman, Todd M. Brye, and Anthony L. Rollins, entitled Data Mining Assists in a Relational Database Management System, Application Ser. No. 09/411,809, filed Oct. 1, 1999, by Todd M. Brye, Brian D. Tate, and Anthony L. Rollins, entitled SQL-Based Data Reduction Techniques for Delivering Data to Analytic Tools, Application Ser. No. PCT/US99/23031, filed Oct. 1, 1999, by Timothy E. Miller, Miriam H Herman, and Anthony L. Rollins, entitled Techniques for Deploying Analytic Models in Parallel, and Application Ser. No. PCT/US99/23019, filed Oct. 1, 1999, by Timothy E. Miller, Brian D. Tate, and Anthony L. Rollins, entitled Analytic Logical Data Model, all of which are incorporated by reference herein, and all of which claim the benefit under 35 U.S.C §119(e) of U.S. provisional patent application Serial No. 60/102,831, filed Oct. 2, 1998, by Timothy E. Miller, Brian D. Tate, James D. Hildreth, Miriam H Herman, Todd M. Brye, and James E. Pricer, entitled Teradata Scalable Discovery.

BACKGROUND OF THE INVENTION

1. Field of the Invention

This invention relates in general to a relational database management system, and in particular, to an SQL-based analytic algorithm for cluster analysis that creates analytic models from the data residing in a relational database.

2. Description of Related Art

Relational databases are the predominate form of database management systems used in computer systems. Relational database management systems are often used in so-called "data warehouse" applications where enormous amounts of data are stored and processed. In recent years, several trends have converged to create a new class of data warehousing applications known as data mining applications. Data mining is the process of identifying and interpreting patterns in databases, and can be generalized into three stages.

Stage one is the reporting stage, which analyzes the data to determine what happened. Generally, most data warehouse implementations start with a focused application in a specific functional area of the business. These applications usually focus on reporting historical snap shots of business information that was previously difficult or impossible to access. Examples include Sales Revenue Reporting, Production Reporting and Inventory Reporting to name a few.

Stage two is the analyzing stage, which analyzes the data to determine why it happened. As stage one end-users gain previously unseen views of their business, they quickly seek to understand why certain events occurred; for example a decline in sales revenue. After discovering a reported decline in sales, data warehouse users will then obviously ask, "Why did sales go down?" Learning the answer to this question typically involves probing the database through an iterative series of ad hoc or multidimensional queries until the root cause of the condition is discovered. Examples include Sales Analysis, Inventory Analysis or Production Analysis.

Stage three is the predicting stage, which tries to determine what will happen. As stage two users become more sophisticated, they begin to extend their analysis to include prediction of unknown events. For example, "Which end-users are likely to buy a particular product", or "Who is at risk of leaving for the competition?" It is difficult for humans to see or interpret subtle relationships in data, hence as data warehouse users evolve to sophisticated predictive analysis they soon reach the limits of traditional query and reporting tools. Data mining helps end-users break through these limitations by leveraging intelligent software tools to shift some of the analysis burden from the human to the machine, enabling the discovery of relationships that were previously unknown.

Many data mining technologies are available, from single algorithm solutions to complete tool suites. Most of these technologies, however, are used in a desktop environment where little data is captured and maintained. Therefore, most data mining tools are used to analyze small data samples, which were gathered from various sources into proprietary data structures or flat files. On the other hand, organizations are beginning to amass very large databases and end-users are asking more complex questions requiring access to these large databases.

Unfortunately, most data mining technologies cannot be used with large volumes of data. Further, most analytical techniques used in data mining are algorithmic-based rather than data-driven, and as such, there are currently little synergy between data mining and data warehouses. Moreover, from a usability perspective, traditional data mining techniques are too complex for use by database administrators and application programmers, and are too difficult to change for a different industry or a different customer.

Thus, there is a need in the art for data mining applications that directly operate against data warehouses, and that allow non-statisticians to benefit from advanced mathematical techniques available in a relational environment.

SUMMARY OF THE INVENTION

To overcome the limitations in the prior art described above, and to overcome other limitations that will become apparent upon reading and understanding the present specification, the present invention discloses a method, apparatus, and article of manufacture for performing data mining applications in a relational database management system. An analytic algorithm for cluster analysis is performed by the computer. The analytic algorithm for cluster analysis includes SQL statements and programmatic iteration for finding groupings in the data retrieved from the relational database management system and for identifying homogenous ones of the groupings as clusters. The analytic algorithm for cluster analysis creates at least one analytic model-within an analytic logical data model from data residing in the relational database.

An object of the present invention is to provide more efficient usage of parallel processor computer systems. An object of the present invention is to provide a foundation for data mining tool sets in relational database management systems. Further, an object of the present invention is to allow data mining of large databases.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention provides a relational database management system (RDBMS) that supports data mining operations of relational databases. In essence, advanced analytic processing capabilities for data mining applications are placed where they belong, i.e., close to the data. Moreover, the results of these analytic processing capabilities can be made to persist within the database or can be exported from the database. These analytic processing capabilities and their results are exposed externally to the RDBMS by an application programmable interface (API).

According to the preferred embodiment, the data mining process is an iterative approach referred to as a "Knowledge Discovery Analytic Process" (KDAP). There are six major tasks within the KDAP:

1. Understanding the business objective.
2. Understanding the source data available.
3. Selecting the data set and "pre-processing" the data.
4. Designing the analytic model.
5. Creating and testing the models.
6. Deploying the analytic models.

The present invention provides various components for addressing these tasks:

An RDBMS that executes Structured Query Language (SQL) statements against a relational database.

An analytic Application Programming Interface (API) that creates scalable data miring functions comprised of complex SQL statements.

Application programs that instantiate and parameterize the analytic API.

Analytic algorithms utilizing:
  Extended ANSI SQL statements,
  a Call Level Interface (CLI) comprised of SQL statements and programmatic iteration, and
  a Data Reduction Utility Program comprised of SQL statements and programmatic iteration.

An analytical logical data model (LDM) that stores results from and information about the advanced analytic processing in the RDBMS.

A parallel deployer that controls parallel execution of the results of the analytic algorithms that are stored in the analytic logical data model.

The benefits of the present invention include:

Data mining of very large databases directly within a relational database.

Management of analytic results within a relational database.

A comprehensive set of analytic operations that operate within a relational database management system.

Application integration through an object-oriented API.

These components and benefits are described in more detail below.

Hardware Environment

Figure 1:
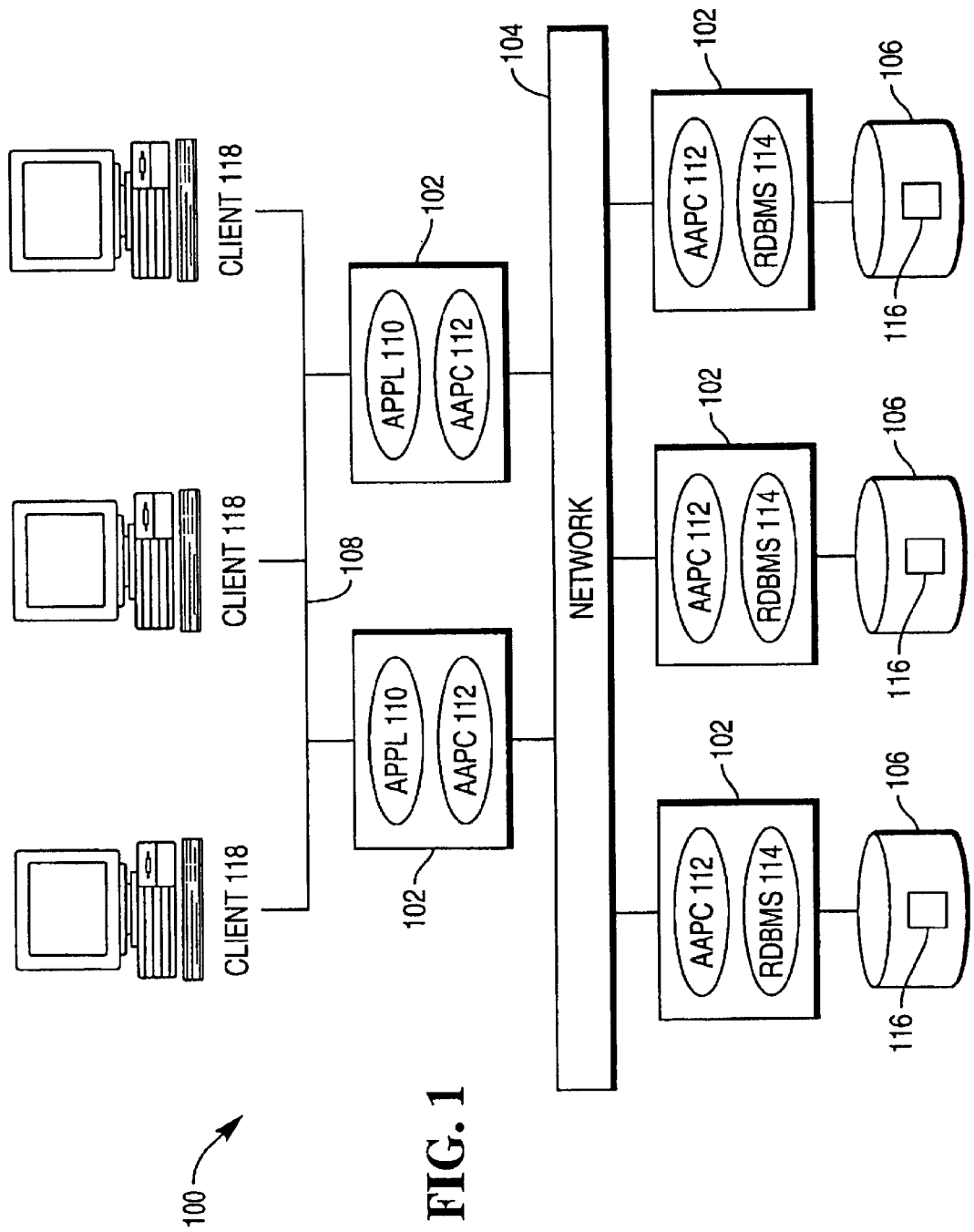
FIG. 1 is a block diagram that illustrates an exemplary computer hardware environment that could be used with the preferred embodiment of the present invention.

FIG. 1 is a block diagram that illustrates an exemplary computer hardware environment that could be used with the preferred embodiment of the present invention. In the exemplary computer hardware environment, a massively parallel processing (MPP) computer system 100 is comprised of one or more nodes 102 interconnected by a network 104. Each of the nodes 102 is comprised of one or more processors, random access memory (RAM), read-only memory (ROM), and other components. It is envisioned that attached to the nodes 102 may be one or more fixed and/or removable data storage units (DSUs) 106 and one or more data communications units (DCUs) 108.

Each of the nodes 102 executes one or more computer programs, such as a Data Mining Application (APPL) 110 performing data mining operations, Advanced Analytic Processing Components (AAPC) 112 for providing advanced analytic processing capabilities for the data mining operations, and/or a Relational Database Management System (RDBMS) 114 for managing a relational database 116 stored on one or more of the DSUs 106 for use in the data mining applications, wherein various operations are performed in the APPL 110, AAPC 112, and/or RDBMS 114 in response to commands from one or more Clients 118. In alternative embodiments, the APPL 110 may be executed in one or more of the Clients 118, or on an application server on a different platform attached to the network 104.

Generally, the computer programs are tangibly embodied in and/or retrieved from RAM, ROM, one or more of the DSUs 106, and/or a remote device coupled to the computer system 100 via one or more of the DCUs 108. The computer programs comprise instructions which, when read and executed by a node 102, causes the node 102 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

Logical Architecture

Figure 2:
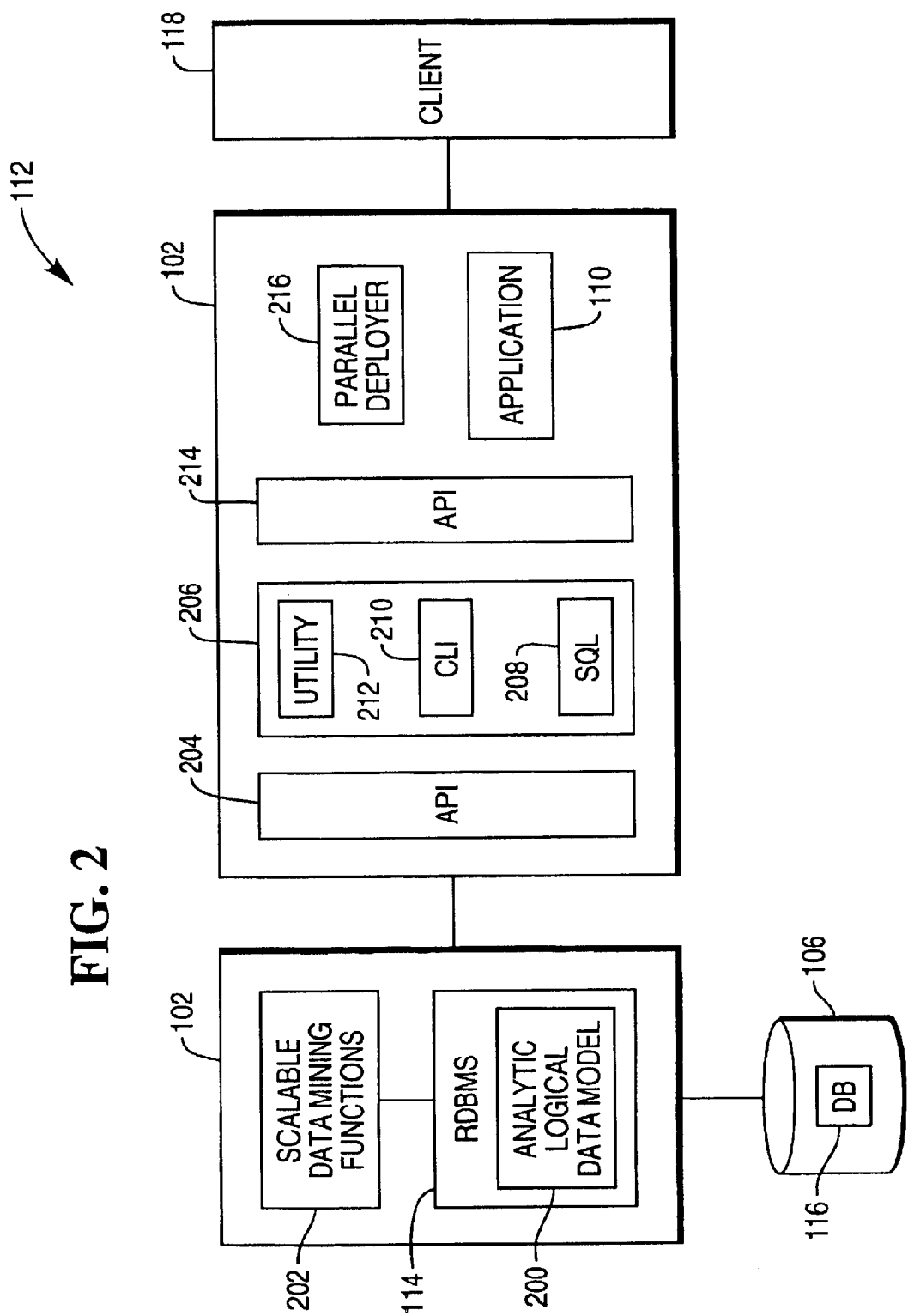
FIG. 2 is a block diagram that illustrates an exemplary logical architecture that could be used with the preferred embodiment of the present invention.

FIG. 2 is a block diagram that illustrates an exemplary logical architecture of the AAPC 112, and its interaction with the APPL 110, RDBMS 114, relational database 116, and Client 118, according to the preferred embodiment of the present invention. In the preferred embodiment, the AAPC 112 includes the following components:

An Analytic Logical Data Model (LDM) 200 that stores results from the advanced analytic processing in the RDBMS 114, One or more Scalable Data Mining Functions 202 that comprise complex, optimized SQL statements that perform advanced analytic processing in the RDBMS 114, An Analytic Application Programming Interface (API) 204 that provides a mechanism for an APPL 110 or other component to invoke the Scalable Data Mining Functions 202, One or more Analytic Algorithms 206 that can operate as standalone applications or can be invoked by another component, wherein the Analytic Algorithms 206 comprise:

Extended ANSI SQL 208 that can be used to implement a certain class of Analytic Algorithms 206, A Call Level Interface (CLI) 210 that can be used when a combination of SQL and programmatic iteration is required to implement a certain class of Analytic Algorithms 206, and A Data Reduction Utility Program 212 that can be used to implement a certain class of Analytic Algorithms 206 where data is first reduced using SQL followed by programmatic iteration.

An Analytic Algorithm Application Programming Interface (API) 214 that provides a mechanism for an APPL 110 or other components to invoke the Analytic Algorithms 206, A Parallel Deployer 216 that controls parallel executions of the results of an Analytic Algorithm 206 (sometimes referred to as an analytic model) that are stored in the Analytic LDM 200, wherein the results of executing the Parallel Deployer 216 are stored in the RDBMS 114.

Note that the use of these various components is optional, and thus only some of the components may be used in any particular configuration.

The preferred embodiment is oriented towards a multi-tier logical architecture, in which a Client 118 interacts with the various components described above, which, in turn, interface to the RDBMS 114 to utilize a large central repository of enterprise data stored in the relational database 116 for analytic processing.

In one example, a Client 118 interacts with an APPL 110, which interfaces to the Analytic API 204 to invoke one or more of the Scalable Data Mining Functions 202, which are executed by the RDBMS 114. The results from the execution of the Scalable Data Mining Functions 202 would be stored as an analytic model within an Analytic LDM 200 in the RDBMS 114.

In another example, a Client 118 interacts with one or more Analytic Algorithms 206 either directly or via the Analytic Algorithm API 214. The Analytic Algorithms 206 comprise SQL statements that may or may not include programmatic iteration, and the SQL statements are executed by the RDBMS 114. In addition, the Analytic Algorithms 206 may or may not interface to the Analytic API 204 to invoke one or more of the Scalable Data Mining Functions 202, which are executed by the RDBMS 114. Regardless, the results from the execution of the Analytic Algorithms 206 would be stored as an analytic model within an Analytic LDM 200 in the RDBMS 114.

In yet another example, a Client 118 interacts with the Parallel Deployer 216, which invokes parallel instances of the results of the Analytic Algorithms 206, sometimes referred to as an Analytic Model. The Analytic Model is stored in the Analytic LDM 200 as a result of executing an instance of the Analytic Algorithms 206. The results of executing the Parallel Deployer 216 are stored in the RDBMS 114.

In still another example, a Client 118 interacts with the APPL 110, which invokes one or more Analytic Algorithms 206 either directly or via the Analytic Algorithm API 214. The results would be stored as an analytic model within an Analytic LDM 200 in the RDBMS 114.

The overall goal is to significantly improve the performance, efficiency, and scalability of data mining operations by performing compute and/or I/O intensive operations in the various components. The preferred embodiment achieves this not only through the parallelism provided by the MPP computer system 100, but also from reducing the amount of data that flows between the APPL 110, AAPC 112, RDBMS 114, Client 118, and other components.

Those skilled in the art will recognize that the exemplary configurations illustrated and discussed in conjunction with FIG. 2 are not intended to limit the present invention. Indeed, those skilled in the art will recognize that other alternative configurations may be used without departing from the scope of the present invention. In addition, it should be understood that the present invention may also apply to other components than those disclosed herein.

Scalable Data Mining Functions

The Scalable Data Mining Functions 202 comprise complex, optimized SQL statements that are created, in the preferred embodiment, by parameterizing and instantiating the corresponding Analytic APIs 204. The Scalable Data Mining Functions 202 perform much of the advanced analytic processing for data mining applications, when performed by the RDBMS 112, without having to move data from the relational database 114.

The Scalable Data Mining. Functions 202 can be categorized by the following functions:

Data Description: The ability to understand and describe the available data using statistical techniques. For example, the generation of descriptive statistics, frequencies and/or histogram bins.

Data Derivation: The ability to generate new variables (transformations) based upon existing detailed data when designing an analytic model. For example, the generation of predictive variables such as bitmaps, ranges, codes and mathematical functions.

Data Reduction: The ability to reduce the number of variables (columns) or observations (rows) used when designing an analytic model. For example, creating Covariance, Correlation, or Sum of Squares and Cross-Products (SSCP) Matrices.

Data Reorganization: The ability to join or denormalize pre-processed results into a wide analytic data set.

Data Sampling/Partitioning: The ability to intelligently request different data samples or data partitions. For example, hash data partitioning or data sampling.

The principal theme of the Scalable Data Mining Functions 202 is to facilitate analytic operations within the RDBMS 112, which process data collections stored in the database 114 and produce results that also are stored in the database 114. Since data mining operations tend to be iterative and exploratory, the database 114 in the preferred embodiment comprises a combined storage and work space environment. As such, a sequence of data mining operations is viewed as a set of steps that start with some collection of tables in the database 114, generate a series of intermediate work tables, and finally produce a result table or view.

Analytic Logical Data Model

The Analytic LDM 200, which is integrated with the relational database 114 and the RDBMS 112, provides logical entity and attribute definitions for advanced analytic processing, i.e., the Scalable Data Mining Functions 202 and Analytic Algorithms 206, performed by the RDBMS 112 directly against the relational database 114. These logical entity and attribute definitions comprise metadata that define the characteristics of data stored in the relational database 114, as well as metadata that determines how the RDBMS 112 performs the advanced analytic processing. The Analytic LDM 200 also stores processing results from this advanced analytic processing, which includes both result tables and derived data for the Scalable Data Mining Functions 202, Analytic Algorithms 206, and the Parallel Deployer 216. The Analytic LDM 200 is a dynamic model, since the logical entities and attributes definitions change depending upon parameterization of the advanced analytic processing, and since the Analytic LDM 200 is updated with the results of the advanced analytic processing.

Analytic Algorithms

The Analytic Algorithms 206 provide statistical and "machine learning" methods to create Analytic LDMs 200 from the data residing in the relational database 114. Analytic Algorithms 206 that are completely data driven can be implemented solely in Extended ANSI SQL 208. Analytic Algorithms 206 that require a combination of SQL and programmatic iteration can be implemented using the CLI 210. Finally, Analytic Algorithms 206 that require almost complete programmatic iteration can be implemented using a Data Reduction Utility Program 212, which involves data pre-processing that reduces the amount of data that a non-SQL algorithm can then process.

The Analytic Algorithms 206 significantly improve the performance and efficiency of data mining operations by providing the technology components to perform advanced analytic operations directly against the RDBMS 112. In addition, the Analytic Algorithms 206 leverage the parallelism that exists in the MPP computer system 100, the RDBMS 112, and the database 114.

The Analytic Algorithms 206 provide data analysts with an unprecedented option to train and apply "machine learning" analytics against massive amounts of data in the relational database 114. Prior techniques have failed as their sequential design is not optinal in an RDBMS 112 environment. Because the Analytic Algorithms 206 are implemented in Extended ANSI SQL 208, through the CLI 210, and/or by means of the Data Reduction Utility Program 212, they can therefore leverage the scalability available on the MPP computer system 100. In addition, taking a data-driven approach to analysis, through the use of complete Extended ANSI SQL 208, allows people other than highly educated statisticians to leverage the advanced analytic techniques offered by the Analytic Algorithms 206.

Analytic Algorithm for Cluster Analysis

One Analytic Algorithm 206, which performs the task of modeling multidimensional data, is "cluster analysis." Cluster analysis finds groupings in the data, and identifies homogenous ones of the groupings as clusters. If the database 116 is large, then the cluster analysis must be scalable, so that it can be completed within a practical time limit.

In the prior art, cluster analysis typically does not work well with large databases 116, due to memory limitations and the execution times required. Often, the solution to finding clusters from massive amounts of detailed data has been addressed by data reduction or sampling, because of the inability to handle large volumes of data. However, data reduction or sampling results in the potential loss of information.

The present invention, on the other hand, solves this problem by performing cluster analysis within the parallel RDBMS 114. In the preferred embodiment, the cluster analysis is performed using a series of Extended ANSI SQL 208 statements and/or a series of scripts comprising groups of statements initiated from the APPL 110. A key feature of the present invention is that high-intensity processing (i.e., data intensive aspects) may be performed directly within the RDBMS 114 using Extended ANSI SQL 208, while low-intensity processing may be performed in the APPL 110, which dynamically generates the Extended ANSI SQL 208.

In the preferred embodiment, only two of the many types of cluster analysis are described: (1) a K-Means model, and (2) a Gaussian Mixture model, both of which are implemented via an Expectation-Maximization (EM) algorithm. The EM algorithm is superior to other methods for statistical modeling, and readily admits categorical and continuous attributes. Of course, those skilled in the art will recognize that other types of cluster analysis and other algorithms could be used without departing from the scope of the present invention.

There are several advantages to implementing cluster analysis within the parallel RDBMS 114, including:

It eliminates the need to move large quantities of data out of the database 116 solely to build a cluster analysis model in the Analytic LDM 200, thereby saving time and inconvenience.

It fits well with the capabilities of the Analytic Algorithms 206, which provides descriptive statistics and transformations directly in the database 116.

It utilizes the parallel processing capabilities inherent within the MPP computer system 100.

It facilitates the storage, analysis and application of cluster analysis models built in the Analytic LDM 200.

Generally, the cluster analysis is performed based on input parameters from the user. In the preferred embodiment, the user may specify a database 116, a table within the database 116, and a list of attributes from the table that will be analyzed for clusters. The user also may identify a type of cluster analysis (e.g., K-Means or Gaussian Mixture), the number of clusters to be searched for within the data, a threshold difference in a Log Likelihood value below which the EM iterations will stop, and a maximum number of iterations independent of the change in the Log Likelihood value. In this embodiment, the Log Likelihood defines the likelihood that a given clustering model could have generated the dataset, i.e., it describes the adequacy of a clustering model fit under the assumptions of a given probabilistic model.

The output comprises a table of values of cluster means, variances and prior probabilities (i.e., the relative number of rows assigned to clusters). A measure of success of cluster identification is provided as the average of all within-cluster variances and a Log Likelihood sum on row-cluster probabilities.

After the user has chosen the number of clusters desired (N), an initialization step randomly associates each row of the table to one of N clusters. This may be accomplished using a sampling function, a (non-random) row modulus function, or some other similar function.

Thereafter, the specified number of iterations are performed. Each iteration performs a number of steps, including an expectation step, a maximization step, and an evaluation step. These steps are described in more detail below.

The expectation step calculates the means, variances and frequencies of all rows as assigned to each cluster. A covariance inverse matrix is then constructed using the cluster variances, assuming all covariances to be zero. This simplification effectively results in the row distance calculation in the maximization step being based on a Standardized Euclidean distance, which is a special case of the Mahalanobis Distance (MD). This vastly improves the performance of the cluster analysis, since the number of calculations required are proportional to the number of columns, rather than to the square of the number of columns.

The maximization step calculates each row's distance to the mean of each cluster using the Mahalanobis Distance, which is based on the means and variances from the expectation step. Under the K-Means model, rows are re-assigned to clusters by associating each row to the closest cluster centroid using the lowest Mahalanobis Distance. Under the Gaussian Mixture model, rows are re-assigned to clusters with a probabilistic weighting, after units of distance have been transformed to units of standard deviation of the standard normal distribution via a Gaussian distance function. In both models, intermediate results are displayed, and passed via tables to the next iteration, wherein these intermediate results comprise cluster means, variances and average within-cluster variances. After the specified number of iterations have executed, this step displays the final results.

The evaluation step identifies resulting clusters. The success of cluster identification depends upon the convergence of the algorithm. Expectation-Maximization approaches are guaranteed to increase the likelihood of the clustering solution with each successive iteration. However, the algorithm may be sensitive to initial starting conditions. The statistical quality of the solution may be evaluated by using a likelihood parameter, wherein the higher the likelihood, the superior the solution. Another criterion for considering cluster quality is a declining average within-cluster variance.

Tests using the K-Means and Gaussian models indicate that they generate very similar cluster centroids. The difference is that the Gaussian model appears to converge faster with fewer iterations than the K-Means model. On the other hand, the Gaussian model appears to require more execution time, so the overall performance times of the K-Means and Gaussian models maybe very similar; with a slight edge to the Gaussian model. The best model night be a hybrid of the K-Means and Gaussian models, since the K-Means appears to converge more quickly in early iterations, while the Gaussian is better on later iterations.

Alternative embodiments could include a number of improvements. For example, special consideration could be given when variances within a cluster drop to zero as a result of a set of constants in a dimension. Moreover, it is possible to compute probabilities, responsibilities, and mixture parameters horizontally, speeding up the calculation times by orders of magnitude.

Finally, the cluster analysis could be generalized to use any probability density function (PDF) for the weighting function. For example, it may be optimal to use an exponential PDF to transform Mahalanobis Distances to weights for data with exponentially distributed variables. Alternative PDF's may produce better cluster analysis results in various kinds of data.

Logic of the Preferred Embodiment

Figure 3:
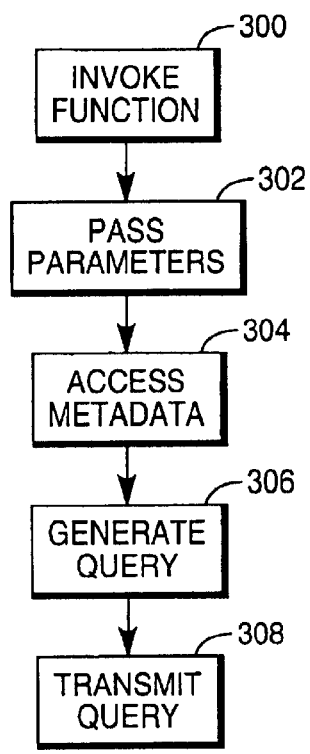
FIGS. 3, 4 and 5 are flowcharts that illustrate exemplary logic performed according to the preferred embodiment of the present invention.
Figure 4:
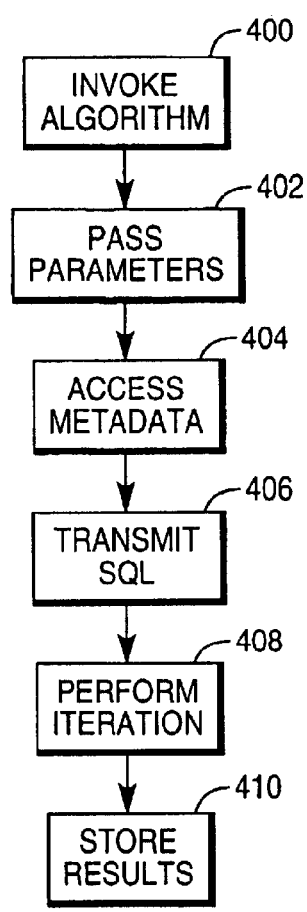
Figure 5:
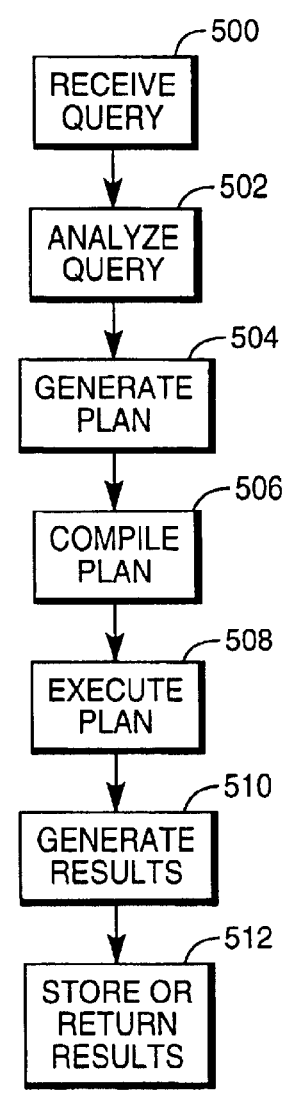

Flowcharts which illustrate the logic of the preferred embodiment of the present invention are provided in FIGS. 3, 4, and 5. Those skilled in the art will recognize that this logic is provided for illustrative purposes only and that different logic may be used to accomplish the same results.

Referring to FIG. 3, this flowchart illustrates the logic of the Scalable Data Mining Functions 202 according to the preferred embodiment of the present invention.

Block 300 represents the one or more of the Scalable Data Mining Functions 202 being created via the API 204. This may entail, for example, the instantiation of an object providing the desired function.

Block 302 represents certain parameters being passed to the API 204, in order to control the operation of the Scalable Data Mining Functions 202.

Block 304 represents the metadata in the Analytic LDM 200 being accessed, if necessary for the operation of the Scalable Data Mining Function 202.

Block 306 represents the API 204 generating a Scalable Data Mining Function 202 in the form of a data mining query based on the passed parameters and optional metadata.

Block 308 represents the Scalable Data Mining Function 202 being passed to the RDBMS 112 for execution.

Referring to FIG. 4, this flowchart illustrates the logic of the Analytic Algorithms 206 according to the preferred embodiment of the present invention.

Block 400 represents the Analytic Algorithms 206 being invoked, either directly or via the Analytic Algorithm API 214.

Block 402 represents certain parameters being passed to the Analytic Algorithms 206, in order to control their operation. One or more input parameters are provided for the Analytic Algorithm 206 for cluster analysis, including a list of attributes to be analyzed for clusters, a type of cluster analysis, a number of clusters to be searched for within the data, an iteration threshold, and a maximum number of iterations.

Block 404 represents the metadata in the Analytic LDM 200 being accessed, if necessary for the operation of the Analytic Algorithms 206.

Block 406 represents the Analytic Algorithms 206 passing SQL statements to the RDBMS 112 for execution and Block 408 optionally represents the Analytic Algorithms 206 performing programmatic iteration. Those skilled in the art will recognize that the sequence of these steps may differ from those described above, in that the sequence may not include both steps, it may include additional steps, and it may include iterations of these steps.

In the preferred embodiment, the Analytic Algorithm 206 for cluster analysis is performed using both Extended ANSI SQL 208 statements passed to the RDBMS 112 at Block 406 and programmatic iteration executed at Block 408. When the Analytic Algorithm 206 for cluster analysis is being performed, the Extended ANSI SQL 208 statements and programmatic iteration find groupings in the data retrieved from the relational database 116 and identify homogenous ones of the groupings as clusters. Specifically, these Blocks first randomly associate each row of a specified table to one or more clusters, and then perform a specified number of programmatic iterations on the clusters, where each programmatic iteration dynamically generates Extended ANSI SQL 208 statements comprising an expectation step, a maximization step, and an evaluation step.

As noted above, the expectation step calculates means, variances and frequencies for the rows assigned to each cluster. The maximization step calculates the row distances to the mean of each cluster using means and variances from the expectation step, wherein rows can be re-assigned to clusters by associating each row to its closest cluster centroid. In the maximization step, intermediate results may be displayed, and are passed via tables to the next iteration, wherein these intermediate results comprise cluster means, variances and average within-cluster variances. After the specified number of iterations have executed, this step displays the final results. Finally, the evaluation step identifies any resulting clusters, which depends on observations of convergence.

Block 410 represents the Analytic Algorithms 206 storing results in the Analytic LDM 200. Specifically, the output for the Analytic Algorithm 206 for cluster analysis may include the cluster means, variances, and prior probabilities (a measure of success of cluster identification provided as an average of all within-cluster variances).

Referring to FIG. 5, this flowchart illustrates the logic performed by the RDBMS 112 according to the preferred embodiment of the present invention.

Block 500 represents the RDBMS 112 receiving a query or other SQL statements.

Block 502 represents the RDBMS 112 analyzing the query.

Block 504 represents the RDBMS 112 generating a plan that enables the RDBMS 112 to retrieve the correct information from the relational database 114 to satisfy the query.

Block 506 represents the RDBMS 112 compiling the plan into object code for more efficient execution by the RDBMS 112, although it could be interpreted rather than compiled.

Block 508 represents the RDBMS 112 initiating execution of the plan.

Block 510 represents the RDBMS 112 generating results from the execution of the plan.

Block 512 represents the RDBMS 112 either storing the results in the Analytic LDM 200, or returning the results to the Analytic Algorithm 206, APPL 110, and/or Client 116.

CONCLUSION

This concludes the description of the preferred embodiment of the invention. The following describes an alternative embodiment for accomplishing the same invention. Specifically, in an alternative embodiment, any type of computer, such as a mainframe, minicomputer, or personal computer, could be used to implement the present invention.

In summary, the present invention discloses a method, apparatus, and article of manufacture for performing data mining applications in a relational database management system. An analytic algorithm for cluster analysis is performed by the computer. The analytic algorithm for cluster analysis includes SQL statements and programmatic iteration for finding groupings in the data retrieved from the relational database management system and for identifying homogenous ones of the groupings as clusters. The analytic algorithm for cluster analysis creates at least one analytic model within an analytic logical data model from data residing in the relational database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for performing data mining applications, comprising:
   (a) a computer system having one or more data storage devices connected thereto;
   (b) a relational database management system, executed by the computer system for managing a relational database stored on the data storage devices; and
   (c) an analytic algorithm for cluster analysis performed by the computer system, wherein the analytic algorithm for cluster analysis includes SQL statements and programmatic iteration for finding one or more groupings in data retrieved from the relational database management system and for identifying homogenous ones of the groupings as clusters, and the analytic algorithm for cluster analysis creates at least one analytic model within an analytic logical data model from data residing in the relational database.

2. The system of claim 1, wherein the analytic algorithm for cluster analysis is performed in accordance with one or more input parameters comprising:
   a list of attributes to be analyzed for clusters,
   a type of duster analysis,
   a number of dusters to be searched for within the data,
   an iteration threshold, or
   a maximum number of iterations.

3. The system of claim 1, the analytic algorithm for cluster analysis generates output comprising cluster means, variances, or prior probabilities.

4. The system of claim 3, wherein the prior probabilities comprise a measure of success of cluster identification as an average of all within-cluster variances.

5. The system of claim 1, wherein the analytic algorithm for cluster analysis randomly associates each row of a specified table to one or more clusters, and performs a specified number of iterations on the clusters, where each iteration performs an expectation step, a maximization step, and evaluation step.

6. The system of claim 5, wherein the expectation step comprises:
   calculating means, variances and frequencies for the rows assigned to each cluster, and constructing a covariance inverse matrix using the calculated variances.

7. The system of claim 6, wherein the constructing step assumes the covariances arc zero.

8. The system of claim 6, wherein the covariances are based on a Standardized Euclidean distance.

9. The system of claim 8, wherein the Standardized Euclidean distance improves the cluster analysis' performance, since the number of calculations required are proportional to a number of columns rather than to a square of the number of columns.

10. The system of claim 8, wherein the Standardized Euclidean distance comprises a Mahalanobis Distance (MD).

11. The system of claim 10, wherein the constructing step comprises:
   calculating each row's distance to each cluster using the Mahalanobis Distance.

12. The system of claim 11, wherein the calculating step uses means and variances form the expectation step.

13. The system of claim 11, wherein the constructing step comprises:
   under a K-Means model, re-assigning rows to clusters by associating each row to a closest cluster centroid using a lowest Mahalanobis Distance.

14. The system of claim 11, wherein the constructing step comprises:
under a Gaussian Mixture mode, re-assigning rows to clusters with probabilistic weighting after units of distance have been transformed to units of standard deviation of a standard normal distribution by a Gaussian distance function.

15. The system of claim 6, wherein the constructing step comprises:
displaying intermediate results from the calculating and constructing steps, and passing the intermediate results onto a next iteration.

16. The system of claim 15, wherein the intermediate results comprise cluster means, variances and average within-cluster variances.

17. The system of claim 6, further comprising, after a specified number of iterations have been performed, displaying final results.

18. The system of claim 5, wherein the evaluation step comprises identifying any resulting claims.

19. The system of claim 18, wherein the identifying step depends on observations of convergence.

20. The system of claim 18, wherein the identifying step depends on a pattern of declining average within-cluster variances.

21. The system of claim 18, wherein the identifying step depends on an accurate production of cluster centroids.

22. The system of claim 1, wherein the computer system is a massively parallel processing (MPP) computer system, and the analytic algorithm for cluster analysis is performed concurrently in parallel by the computer system.

23. The computer-implemented system of claim 1, wherein the analytic algorithm for cluster analysis is implemented as a combination of SQL statements performed by the relational database management system and programmatic iteration performed by an application program.

24. A method for performing data mining applications, comprising:
(a) managing a relational database stored on one or more data storage devices connected to a computer system; and
(b) performing an analytic algorithm for cluster analysis in the computer system, wherein the analytic algorithm for cluster analysis includes SQL statements and programmatic iteration for finding one or more groupings in data retrieved from the relational database management system and for identifying homogenous ones of the groupings as clusters, and the analytic algorithm for cluster analysis creates at least one analytic model within an analytic logical data model from data residing in the relational database.

25. The method of claim 24, wherein the analytic algorithm for cluster analysis is performed in accordance with one or more input parameters comprising:
a list of attributes to be analyzed for clusters,
a type of cluster analysis,
a number of clusters to be searched for within the data,
an iteration threshold, or
a maximum number of iterations.

26. The method of claim 24, the analytic algorithm for cluster analysis generates output comprising cluster means, variances, or prior probabilities.

27. Tec method of claim 26, wherein the prior probabilities comprise a measure of success of cluster identification as an average of all within-cluster variances.

28. The method of claim 24, wherein the analytic algorithm for cluster analysis comprises:
randomly associating each row of a specified table to one or more clusters, and
performing a specified number of iterations on the clusters, where each iteration performs an expectation stop, a maximization step, and an evaluation step.

29. The method of claim 28, wherein the expectation step comprises:
calculating means, variances and frequencies for the rows assigned to each cluster, and constructing a covariance inverse matrix using the calculated variances.

30. The method of claim 29, wherein the constructing step assumes the covariances are zero.

31. The method of claim 29, wherein the covariances are based on a Standardized Euclidean distance.

32. The method of claim 31, wherein the Standardized Euclidean distance improves the cluster analysis' performance, since the number of calculations required are proportional to a number of columns rather than to a square of the number of columns.

33. The method of claim 31, wherein the Standardized Euclidean distance comprises a Mahalanobis Distance (MD).

34. The method of claim 33, wherein the constructing step comprises:
calculating each row's distance to each cluster using the Mahalanobis Distance.

35. The method of claim 34, wherein the calculating step uses means and variances from the expectation step.

36. The method of claim 34, wherein the constructing step comprises:
under a K-Means model, re-assigning rows to clusters by associating each tow to a closest cluster centroid using a lowest Mahalanobis Distance.

37. The method of claim 34, wherein the constructing step comprises:
under a Gaussian Mixture model, re-assigning rows to clusters with a probabilistic weighting after units of distance have been transformed to units of standard deviation of a standard normal distribution by a Gaussian distance function.

38. The method of claim 29, wherein the constructing step comprises:
displaying intermediate results from the calculating and constructing steps, and passing the intermediate results onto a next iteration.

39. The method of claim 38, wherein the intermediate results comprise cluster means, variances and average within-cluster variances.

40. The method of claim 29, further comprising, after a specified number of iterations have been performed, displaying final results.

41. The method of claim 28, wherein the evaluation step comprises identifying any resulting clusters.

42. The method of claim 41, wherein the identifying step depends on observations of convergence.

43. The method of claim 41, wherein the identifying step depends on a pattern of declining average within-cluster variances.

44. The method of clam 41, wherein the identifying step depends on an accurate production of cluster centroids.

45. The method of claim 24, wherein the computer system is a massively parallel processing (MPP) computer system, and the analytic algorithm for cluster analysis is performed concurrently in parallel by the computer system.

46. The method of claim 24, wherein the analytic algorithm for cluster analysis is implemented as a combination of SQL statements performed by the relational database management system and programmatic iteration performed by an application program.

47. An article of manufacture comprising logic embodying a method for performing data mining applications, the logic comprising
(a) managing a relational database stored on one or more data storage devices connected to a computer; and
(b) performing an analytic algorithm for cluster analysis in the computer, wherein the analytic algorithm for cluster analysis includes SQL statements and programmatic iteration for finding one or more groupings in data retrieved from tire relational database management system and for identifying homogenous ones of the groupings as clusters, and the analytic algorithm for cluster analysis creates at least one analytic model within an analytic logical data model from data residing in the relational database.

48. The article of manufacture of claim 47, wherein the analytic algorithm for duster analysis is performed in accordance with one or more input parameters comprising:
a list of attributes to be analyzed for clusters,
a type of cluster analysis,
a number of clusters to be shed for within the data,
an iteration threshold, or
a maximum number of iterations.

49. The article of manufacture of claim 47, the analytic algorithm for cluster analysis generates output comprising cluster means, variances, or prior probabilities.

50. The article of manufacture of claim 49, wherein the prior probabilities comprise a measure of success of cluster identification as an average of all within-cluster variances.

51. The article of manufacture of claim 47, wherein the analytic algorithm for cluster analysis comprises:
randomly associating each row of a specified table to one or more clusters, and
performing a specified number of iterations on the clusters, where each iteration performs an expectation step, a maximization step, and an evaluation step.

52. The article of manufacture of claim 51, wherein the expectation step comprises:
calculating means, variances and frequencies for the rows assigned to each cluster, and
constructing a covariance inverse matrix using the calculated variances.

53. The article of manufacture of claim 52, wherein the constructing step assumes the covariances are zero.

54. The article of manufacture of claim 52, wherein the covariances are based on a Standardized Euclidean distance.

55. The article of manufacture of claim 54, wherein the Standardized Euclidean distance improves the cluster analysis' performance, since the number of calculations required are proportional to a number of columns rather than to a square of the number of columns.

56. The article of manufacture of claim 54, wherein the Standardized Euclidean distance comprises a Mahalanobis Distance (MD).

57. The article of manufacture of claim 56, wherein the constructing step comprises:
calculating each row's distance to each cluster using the Mahalanobis Distance.

58. The article of manufacture of claim 57, wherein the calculating step uses means and variances from the expectation step.

59. The article of manufacture of claim 57, wherein the constructing step comprises:
under a K-Means model, re-assigning rows to clusters by associating each row to a closest cluster centroid using a lowest Mahalanobis Distance.

60. The article of manufacture of claim 57, wherein the constructing step comprises:
under a Gaussian Mixture model, re-assigning rows to clusters with a probabilistic weighting after units of distance have been transformed to units of standard deviation of a standard normal distribution by a Gaussian distance fiction.

61. The article of manufacture of claim 52, wherein the constructing step comprises:
displaying intermediate results from the calculating and constructing steps, and
passing the intermediate results onto a next iteration.

62. The method of claim 61, wherein the intermediate results comprise cluster means, variances and average within-cluster variances.

63. The article of manufacture of claim 52, further comprising, after a specified number of iterations have been performed, displaying final results.

64. The article of manufacture of claim 51, wherein the evaluation step comprises identifying any resulting clusters.

65. The method of claim 64, wherein the identifying step depends on observations of convergence.

66. The method of claim 64, wherein the identifying step depends on a pattern of declining average within-cluster variances.

67. The method of claim 64, wherein the identifying step depends on an accurate production of cluster centroids.

68. The article of manufacture of claim 47, wherein the computer system is a massively parallel processing (MPP) computer system, and the analytic algorithm for cluster analysis is performed concurrently in parallel by the computer system.

69. The article of manufacture of claim 47, wherein the analytic algorithm for cluster analysis is implemented as a combination of SQL statements performed by the relational database management system and programmatic iteration performed by an application program.

* * * * *

UNITED STATES PATENT AND TRADEMARK OFFICE
CERTIFICATE OF CORRECTION

PATENT NO. : 6,816,848 B1
DATED : November 9, 2004
INVENTOR(S) : Hildreth, J.D. and Cunningham, S.

It is certified that error appears in the above-identified patent and that said Letters Patent is hereby corrected as shown below:

Column 12,
Line 38, after "and" insert -- an --.

Column 13,
Line 20, after "resulting" delete "claims" and insert -- clusters --.

Column 15,
Line 13, after "from" delete "tire" and insert -- the --.

Column 16,
Line 22, after "distance" delete "fiction" and insert -- function --.

Signed and Sealed this

Tenth Day of January, 2006

JON W. DUDAS
*Director of the United States Patent and Trademark Office*